(12) United States Patent
Osborne, Jr.

(10) Patent No.: US 6,592,315 B2
(45) Date of Patent: Jul. 15, 2003

(54) SELF-FEEDING APPARATUS WITH HOVER MODE

(76) Inventor: William Joseph Osborne, Jr., 155 Shughart Rd., Carlisle, PA (US) 17013

( * ) Notice: Subject to any disclaimer, the term of this patent is extended or adjusted under 35 U.S.C. 154(b) by 82 days.

(21) Appl. No.: 09/850,574

(22) Filed: May 7, 2001

(65) Prior Publication Data

US 2002/0064438 A1 May 30, 2002

Related U.S. Application Data

(60) Provisional application No. 60/202,817, filed on May 8, 2000.

(51) Int. Cl.[7] .............................................. A47G 21/08
(52) U.S. Cl. ........................... 414/9; 414/730; 414/740; 414/744.3; 414/744.6; 414/744.7; 901/2; 901/16; 901/18
(58) Field of Search ............................. 414/9, 730, 738, 414/739, 740, 744.3, 744.6, 744.7, 744.8; 901/2, 14, 15, 16, 17, 18

(56) References Cited

U.S. PATENT DOCUMENTS

| 3,885,681 A | 5/1975 | Mancino |
| 3,907,126 A | 9/1975 | Sydnor, Sr. |
| 4,162,868 A | 7/1979 | Stapleton et al. |
| 4,277,213 A | 7/1981 | Morewood |
| 4,433,950 A | 2/1984 | Hanger et al. |
| 4,522,543 A | 6/1985 | Robinson |
| 5,037,261 A | 8/1991 | Morewood |
| 5,282,711 A | 2/1994 | Frische |

FOREIGN PATENT DOCUMENTS

| EP | 0 523 292 A1 A1 | 1/1993 |
| FR | 2 692 460 A1 | 12/1993 |

OTHER PUBLICATIONS

Machiel Van Der Loos, "Dinner With a Guest", 1989 Videotape.

Primary Examiner—Janice L. Krizek (57) ABSTRACT

A robotic self-feeding device uses a multiplicity of dishes, utensils and control methods to handle a wide variety of food, including sandwiches. Its operating sequence has a hover mode in which a utensil is automatically steered over a food holder and is constrained from moving away from the food holder. The user points to the desired food with the utensil and triggers pickup which is automatically accomplished. Its gripper can operate tong utensils to grasp food. It can cut food. The process of eating is thus easy and intuitive for people who may have a wide variety of severe paralysis disabilities.

14 Claims, 7 Drawing Sheets

SELF-FEEDING APPARATUS WITH HOVER MODE

This application claims the benefit of Provisional Application No. 60/202,817 filed May 8, 2000.

BACKGROUND

This invention was developed with funding from the U.S. Department of Education, SBIR order #ED-99-PO-4650; Req/Ref# EDSER-99-000264

CROSS REFERENCES TO RELATED APPLICATIONS

Not applicable

BACKGROUND

1. Field of Invention

This invention relates to mechanical, automatic or robotic devices which permit people with disabilities to feed themselves, specifically to self-feeding devices which permit handling a wide variety of foods under programmable control with a multiplicity of possible utensils and user interfaces.

BACKGROUND

2. Discussion of Prior Art

U.S. Pat. No. 3,885,681, Pasquale M. Maucino, 1974, discloses a non powered feeding device which requires the user to grasp a mouth-piece and maneuver a spoon to pick up food, then maneuver the spoon onto a fixed support. The user then releases the mouthpiece and eats the food. This requires the user to have a wide range of head motions which limits its use to a small set of those with severe paralysis. It is not a dignified way to eat.

U.S. Pat. No. 3,907,126, Garland S. Sydnur, Sr., 1974, discloses a powered mechanical device consisting of a table with columns holding food. The user triggers the food to be pushed forward in a column to a hole through which it drops down onto the spoon which then pivots out to a position where the user can reach it. This is a difficult apparatus to set up and maintain. It uses no standard dishes, in fact no dishes at all. One could not use this and eat at table with family or friends.

U.S. Pat. No. 4,162,868, Stapleton, Browne & Weatherholt, 1979, discloses a mechanical, powered self-feeding device utilizing containers of food and a spoon which moves in a reciprocating straight path. Food drops from the bottom of a container onto the spoon and the spoon them moves toward the user's mouth. This device works only with a limited variety of foods. The user must eat with the whole apparatus inches from his/her nose. Not very dignified.

U.S. Pat. No. 4,277,213, William H. Morewood, 1981, discloses a mechanical, powered, self-feeding device for automatically lifting food from the eating surface of a plate to an eating position located above the plate. The spoon is moved to a rotating plate or a bowl by a set of cams and levers and then to a position where the user can reach it A pusher arm pushes food onto the spoon.

U.S. Pat. No. 5,037,261, William H. Morewood, 1991, discloses an improved spoon support mechanism for the device disclosed in U.S. Pat. No. 4,277,213, William H. Morewood, 1981.

The device specified in these two patents is currently on the market as the Winsford Feeder. It works with only a limited variety of foods. It has only a single method of control. It cannot handle multiple food holding vessels at one time. It cannot handle sandwiches. It cannot operate utensils such as tongs.

U.S. Pat. No. 4,433,950, Hanger & Walker, 1984, discloses a mechanical, powered self-feeding device wherein a pivoted arm carries a spoon between a raised position for eating and a lower position for filling from a rotating plate.

U.S. Pat. No. 5,282,711, Eric A. Frische, 1994, discloses a powered self-feeding device consisting of a rotating, compartmented food receptacle. A feeding utensil mounted on a rod is moved down to the food receptacle to get food and up to the eating position by means of levers.

U.S. Pat. No. 4,522,543, Eric Robinson, 1985, discloses a powered, mechanic self-feeding device with a spoon mounted on a rod which is moved into a food receptacle and up to an eating position by mechanical means.

French Pat. No. 2,692,460, Loustalot Franciose, 1992 discloses a powered, mechanical self feeding device which utilizes a rotating food receptacle to move food into a tilted spoon which is raised into eating position by mechanical means.

The previous six patents above, U.S. Pat. Nos. 4,277,213, 5,037,261, 4,433,950, 5,282,711, 4,522,543, and 2,692,460 are limited to a single food pick-up path because path control is strictly mechanical i.e it cannot be flexibly programmed with a microprocessor. This limits their use to the few types of food which can be reliably picked up by the chosen utensil path. None of them can pick up and operate a utensil such as a tong. None of them can cut food. None of them can gather separated pieces of food together for easier pickup. None of them can handle sandwiches.

European Pat. No. EP 0 523 292 A1, Michael Topping, 1991, discloses a robotic self feeding device consisting of a robotic arm, a cranked spoon, a control unit, a dish and a display unit. It utilizes one kind of utensil only, the cranked spoon with a coal-scoop front and scoops in a forward direction only. It does not use standard tableware such as forks and teaspoons, soup spoons or tablespoons. It cannot change utensils to suit different kinds of food in the same meal. It has no means to handle sandwiches It It has no means to cut food into smaller pieces. It can retrieve food only from a rectangular dish, not from standard round plates and bowls. Food must be carefully laid down in strips the width of the spoon in this rectangular dish.

Although this device has a sequence of operation, it does not contain a hover mode. The user must step through the stripes of food one by one to get to the one they want. The food preparer must prepare food of a limited range of consistencies and lay it out in an unnatural pattern of stripes, rather than putting it in in areas on the plate in the customary manner.

DeVAR—the Desktop Vocational Assistive Robot, H. F. Machiel Van der Loos, PhD et al of the Department of Veterans Affairs Medical center, Palo Alto, Calif., and Stanford University Mechanical Engineering Dept.415-493-5000x5971, vdl@roses.stanford.edu. Use of DeVAR for self feeding is documented on a videotape entitled "Dinner with a Guest",1989. The video discloses a small industrial robot arm mounted on a round table. The user requests a programmed routine via voice input. The robot picks up a fork. The user requests motions in x,y & z directions until he has speared a piece of meat. He then verbally requests a preprogrammed routine to bring the fork to his mouth. He does a similar task with a spoon.

There is no operating sequence, only a set of preprogrammed routines, all of which are always available. There is no hover mode in which control is reduced to two directions in the horizontal plane and in which the utensil is constrained to remain over the food vessel. This makes the acquisition of food tedious and fatiguing, requiring constant attention. No interface besides voice is provided so people with no speech cannot use it. Each set of preprogrammed motions is requested via an unique spoken command. Because there is no operating sequence the user cannot proceed to the next logical step in the eating process by using a repeated command or actuation method each time.

DeVAR has only a simple gripper and can only pick up and grasp a utensil. It cannot operate a specialized grasping utensil such as a tong.

As can be seen, a number of self-feeding devices have been developed and two are currently on the market. However none of them permit handling such a wide variety of foods as my invention. None can operate utensils such as tongs. None has a hover mode and none offer the easy and intuitive use that my self-feeding apparatus provides.

SUMMARY

In accordance with the current invention a self feeding apparatus with hover mode comprises a robotic arm, a set of food holding vessels, a set of eating utensils, a gripper, a control apparatus and an operating sequence whereby persons who may have severe paralysis can feed themselves.

OBJECTS AND ADVANTAGES

Accordingly, several objects and advantages of my invention are:

a. It can pick up food from essentially any location on a plate or bowl or other food holding vessel. It does not require food to be laid down in stripes or other artificial patterns. This allows the user to eat in a conventional manner.

b. It does not require the use of unusual, non-standard dishes or trays. This allows the user to eat from the same dishes as others at the table or from restaurant dishes.

c. It allows the user to flexibly choose the food they want by controlling the motion of a utensil over the food. This makes the process of eating more natural, easier, and intuitive.

d. It can handle a wide variety of foods.

e. It can cut food. This means that food preparation need not he as time consuming as with other self-feeding devices.

f. It can automatically gather together food pieces which have become separated for easier pickup.

g. It can handle sandwiches.

h. It can be operated by people with a wider variety of disabilities than other self-feeding devices by use of a wide variety or control methods.

i. It can use unmodified eating utensils.

j. Further objects and advantages of my invention will become apparent from a consideration of the drawings and ensuing description.

| Reference Numerals In Drawings Part I | |
|---|---|
| 1 | Operating Sequence |
| 2 | start point |
| 20 | robot arm |
| 20a | base |
| 20b | shoulder joint |
| 20c | bicep |
| 20d | forearm |
| 20e | wrist |
| 22 | gripper |
| 22a | compression spring |
| 22b | movable lower jaw |
| 22c | pivot |
| 22d | upper jaw |
| 22f | servo |
| 22h | utensil operating lever |
| 22k | cam |
| 22m | utensil operating tab |
| 22n | jaw operating block |
| 22p | threaded rod |
| 22q | nut |
| 22r | support structure |
| 22s | pivot rod |
| 23 | display |
| 24 | control computer |
| 26 | input devices and methods |
| 26a | joystick input |
| 26b | gamepad input |
| 26c | keyboard input |
| 26d | voice, speech, or other audible inpu |
| 26e | multi-switch input |
| 26f | computer pointing device input |
| 27 | eating or food delivery position |
| 28 | utensil |
| 29 | operator |
| 30 | food holding vessels |
| 30a | plate |
| 30b | bowl |
| 30c | sandwich holder |
| 31 | height of hover |
| 32 | eating surface |
| 33 | control input from user |
| 34 | tray |
| 35 | food |
| 37 | output signals |
| 38 | speaker |
| 39 | input signals |
| 40 | sandwich |
| 44 | surface |
| 45 | table surface |
| 50 | vertical steering plane |
| 50a | Left |
| 50b | Right |
| 50c | Up |

-continued

| | |
|---|---|
| 50d | down |
| 52 | horizontal steering plane |
| 52a | Left |
| 52b | Right |
| 52c | toward |
| 52d | away |
| 64 | cutter |
| 64a | cutter tip |
| 64b | cutting edge |
| 80 | sandwich tong |
| 80a | flange |
| 80b | movable upper jaw |
| 80c | fixed lower jaw |
| 80d | operating tab |
| 80e | closing spring |
| 80f | upper jaw pivot |
| 80g | stop block |
| 80g' | stop block |
| 82 | snack food tong |
| 82a | flange |
| 82b | movable upper jaw |
| 82c | fixed lower jaw |
| 82d | tong operating tab |
| 82e | spring |
| 82f | pivot |
| 82g | stop block |
| 82g' | stop block |

Reference Numerals In Drawings Part II

| | |
|---|---|
| 90 | gather path1 |
| 90a | toward & right |
| 90b | down to plate |
| 90c | away & left |
| 90d | up to hover position |
| 92 | gather path2 |
| 92a | toward & left |
| 92b | down to plate |
| 92c | away & right |
| 92d | up to hover position |
| 94 | hover position |
| 96 | pickup position |
| 100 | utensil holder |
| 200 | flow chart key |
| 202 | user input point or mode |
| 204 | sequence choice point |
| 206 | jump to point with same letter |
| 208 | automatic action point |
| 300 | choose utensil mode |
| 300a | get spoon |
| 300b | get fork |
| 300c | get sandwich tong |
| 300d | get snackfood tong |
| 300e | get other utensil |
| 310 | choose food holding vessel mode |
| 310a | go to plate |
| 310b | go to bowl |
| 310c | go to sandwich holder |
| 310d | go to other food vessel |
| 310e | put down utensil |
| 310f | set food delivery position |
| 315 | Set food delivery position mode |
| 315a | toggle steering plane |
| 315b | put down utensil |
| 315c | "GO" action |
| 315d | use steering position to adjust position of utensil tip |
| 320 | hover mode |
| 320a | use steering method to adjust position of utensil tip over food vessel |
| 320b | "GO" action |
| 320c | put down utensil |
| 320d | toggle cutter activation |
| 320e | gather food |
| 320f | go to plate |
| 320g | go to bowl |
| 320h | go to sandwich holder |
| 320i | go to other food vessel |

-continued

| | |
|---|---|
| 320j | check for food pickup mode |
| 322 | check for food pickup mode |
| 322a | "BACK action |
| 322b | "GO" action |
| 324 | eat food mode |
| 324a | put down utensil |
| 324b | "BACK action |
| 324c | "GO" action |

DESCRIPTION OF INVENTION

The drawings show a robotic self-feeding device. It comprises a robot arm, a set of utensils, food holders, a control computer, control software, a display, which can be visual or auditory or tactile, and multiple control input signals from the operator.

Figure 1:
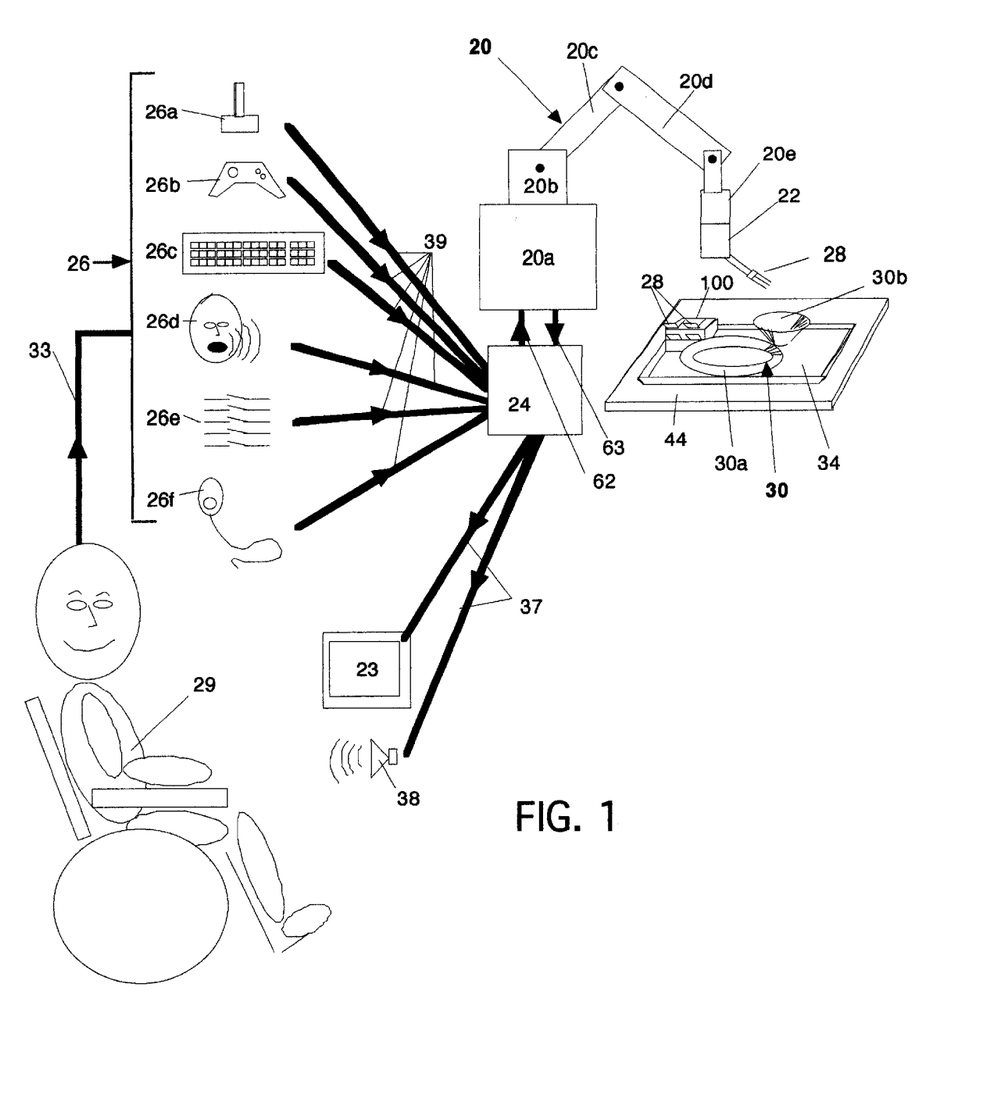
FIG. 1 is a schematic representation of the self-feeding apparatus

FIG. 1 shows a schematic representation of my self-feeding apparatus. A robotic arm 20 comprises a base 20a, a shoulder Joint 20b, a bicep 20c, a forearm 20d, and a wrist 20e. On wrist 20e is mounted a gripper 22. Robot 20 and gripper 22 are operated by signals from a control apparatus or computer 24. A user 29, who may have severe paralysis, provides input signals 33 to one or more of a set of input devices and methods 26. Input devices and methods 26 comprise a joystick input 26a, a gamepad input 26b, a keyboard input 26c, a voice, or speech input 26d, a multi-switch input 26e, and a standard computer pointing device input including but not limited to mouse, trackball, and touchscreen 26f. Input signals 39 from one or more input devices 26 are sent to a control apparatus or computer 24. Computer 24 sends control signals 62 to robot 20 which sends back sensor data 63. Computer 24 sends output signals 37 to a display 23 and a speaker 38. Gripper 20 is shown holding a utensil 28. Within reach of utensil 28 is a planar surface or food tray 34. Positioned on surface 34 are a set of food holding vessels 30, in this case a plate 30a and a bowl 30b and a set of one or more utensil holders 100. Located in holder(s) 100 are a set of one or more utensils 28.

Figure 2:
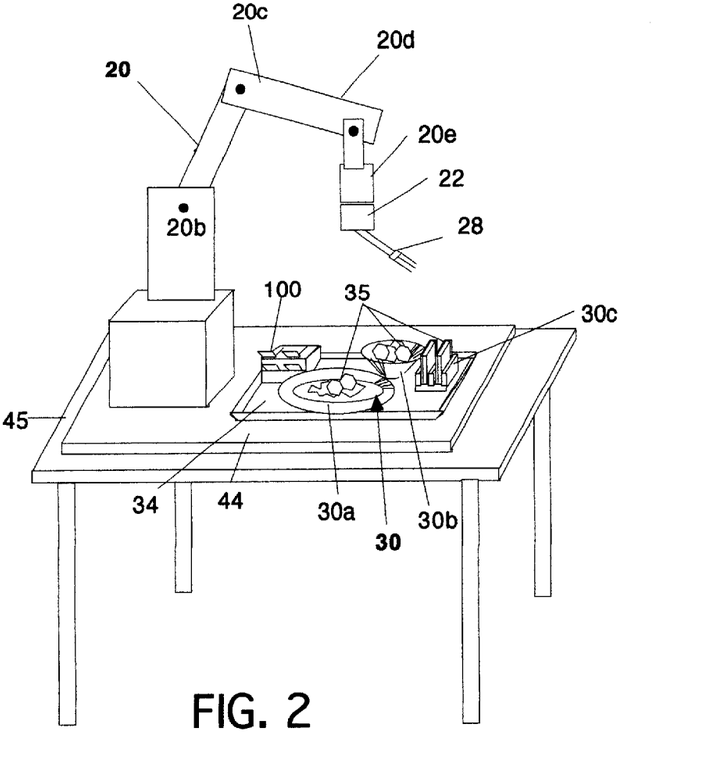
FIG. 2 is an isometric view of the preferred embodiment of the self-feeding apparatus

FIG. 2 shows a schematic representation of the preferred embodiment of my self-feeding apparatus. Robot 20 comprises base 20a, shoulder 20b, bicep 20c, forearm 20d, and wrist 20e. On wrist 20e is mounted gripper 22. Resting on tray 34 is utensil holder 100, plate 30a, and bowl 30b. A supply of food 35 is located on the eating surfaces of plate 30a and bowl 30b. Robot 20 is fixedly attached to an approximately planar surface of base 44. Tray 34 also rests on surface 44. Surface 44 rests or is clamped to a planar surface or table 45.

Figure 3:
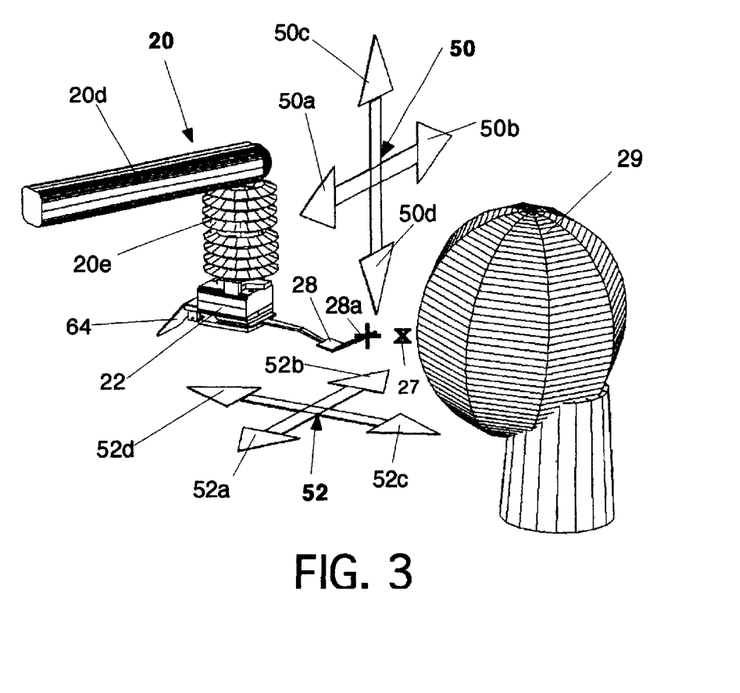
FIG. 3 is an isometric view of the wrist and gripper and user showing steering planes.

FIG. 3 is an isometric view of a user 29 and a utensil 28, during adjustment of an eating position or food delivery position 27. It shows several important points, positions and directions. A horizontal steering plane 52 and a vertical steering plane 50 are shown. Horizontal plane 52 has directions left 52a, right 52b, toward user 52c, and away from user 52d.. Vertical plane 50 has directions left 50a, right 50b, up 50c, and down 50d. All directions are relative to the direction that user 29 is facing. An eating or food delivery position 27 is shown. A utensil tip position 28a is also shown. A cutter 64 is shown attached to gripper 22.

Figure 4:
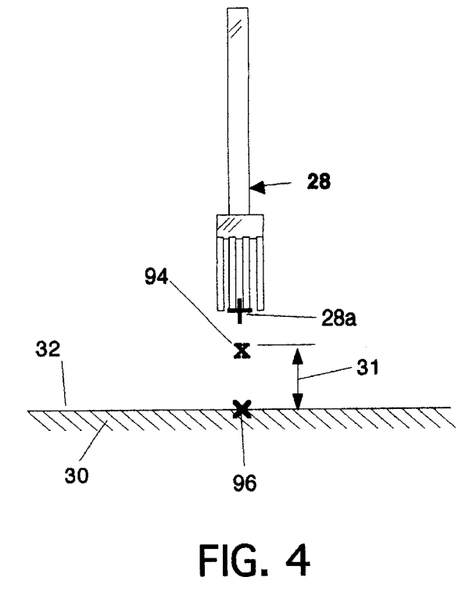
FIG. 4 is a sketch showing the hover point, the utensil tip, and the food pickup point.

FIG. 4 shows a diagram of several important points and positions. An eating surface 32 is shown. Surface 32 is the surface of a food holding vessel 30 which may support food. A food pickup point 96 is shown, which is coplanar with surface 32. Directly vertically above pickup point 96 is shown a hover point 94. A hover height distance 31 is shown. Hover height 31 is approximately 3 cm. A utensil 28 is shown with a tip 28*a* positioned above hover point 94 and pickup point 96.

Figure 5:
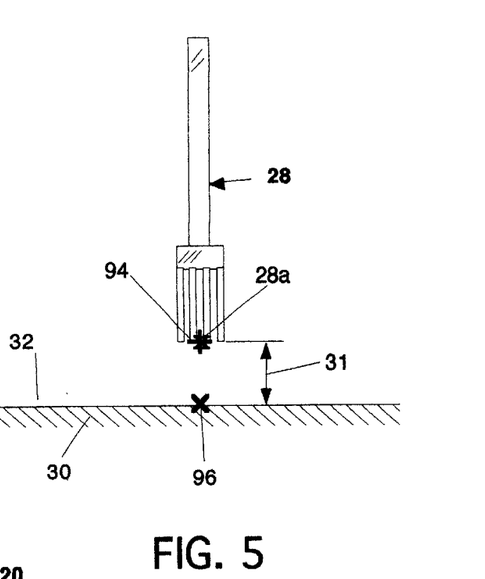
FIG. 5 is a sketch showing the hover point, the utensil tip, and the food pickup point with the utensil in a different position

FIG. 5 shows a diagram of several important points and positions. It contains the same elements as FIG. 4. Utensil 28 is shown located at a position such that its tip 28*a* is the same point as the hover point 94.

Figure 6:
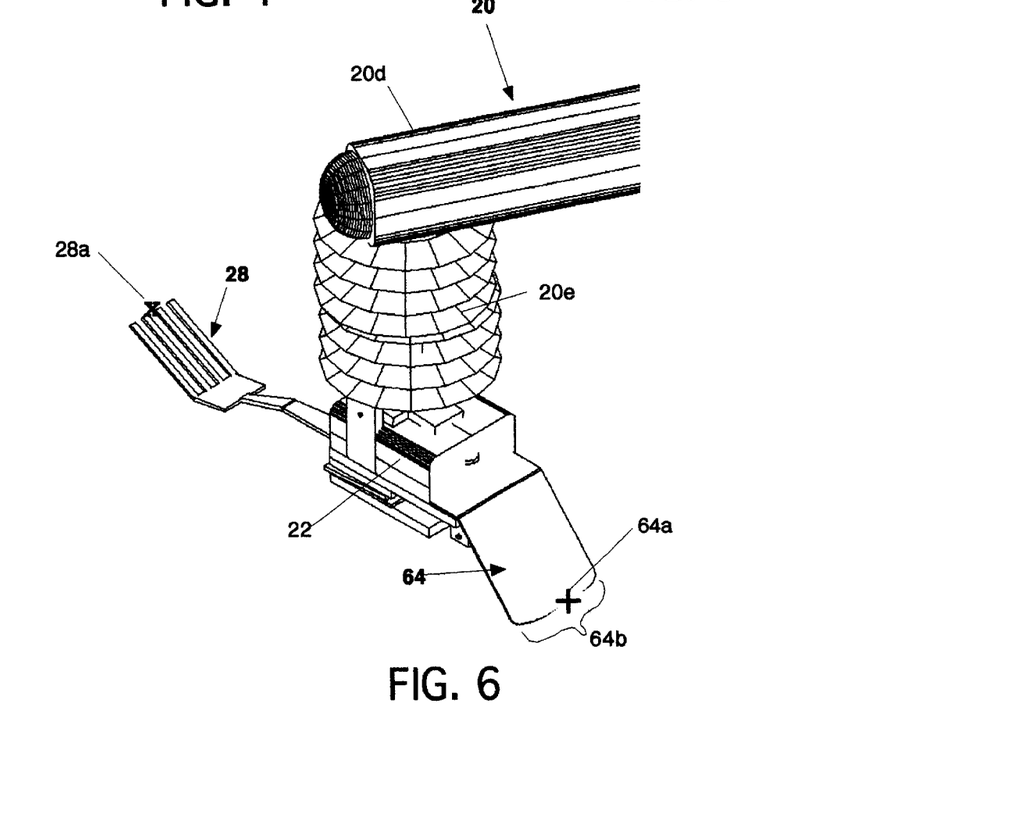
FIG. 6 is an isometric view of the wrist and gripper and utensil and cutter

FIG. 6 is an isometric view of showing the mounting of a cutter. Portions of a robot arm 20 are shown, mounted to forearm 20*d* is a wrist 20*e*. A gripper 22 is attached to wrist 20*e*. A utensil 28 is grasped by gripper 22. A cutter 64 is mounted to gripper 22. A cutting edge 64*b* is indicated by a bracket. A cutter point 64*a* is shown at the center of cutting edge 64*b*. The position of a utensil tip 28*a* is indicated.

Figure 7:
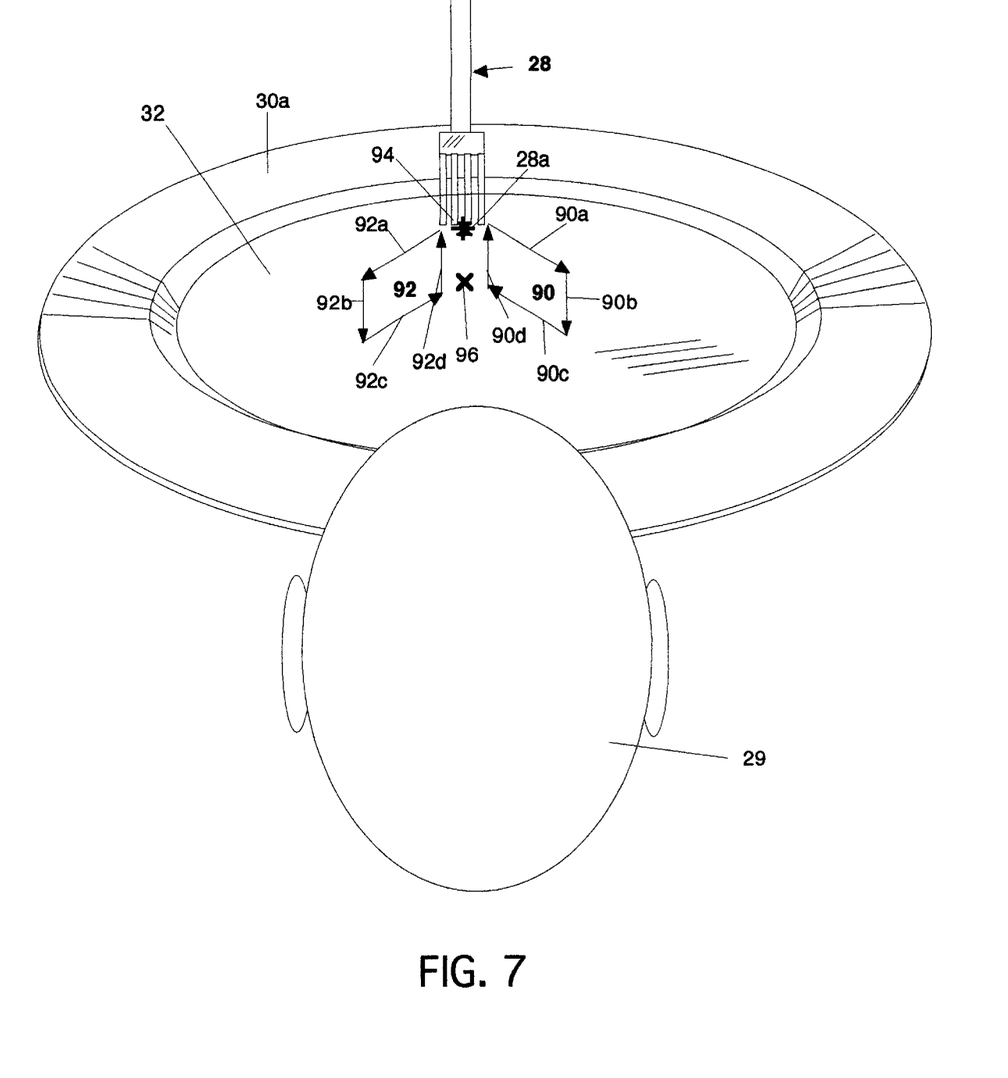
FIG. 7 is a sketch showing gather paths over a plate.

FIG. 7 is a sketch showing two gather paths. A user 29 is shown facing a plate 30*a*. A utensil 28 is shown suspended above the eating surface 32 of plate 30*a*. Utensil tip 28*a* is shown at the hover point 94 which is directly vertically above food pickup point 96. Food gather path1 90 comprises four subpaths or legs. They are "toward & right" 90*a*, "down to plate" 90*b*, "away & left" 90*c*, and "up to hover position" 90*d*.. Food gather path2 92 comprises four subpaths or legs. They are "toward & left" 92*a*, "down to plate" 92*b*, "away & right" 92*e*, and "up to hover position" 92*d*.

Figure 8:
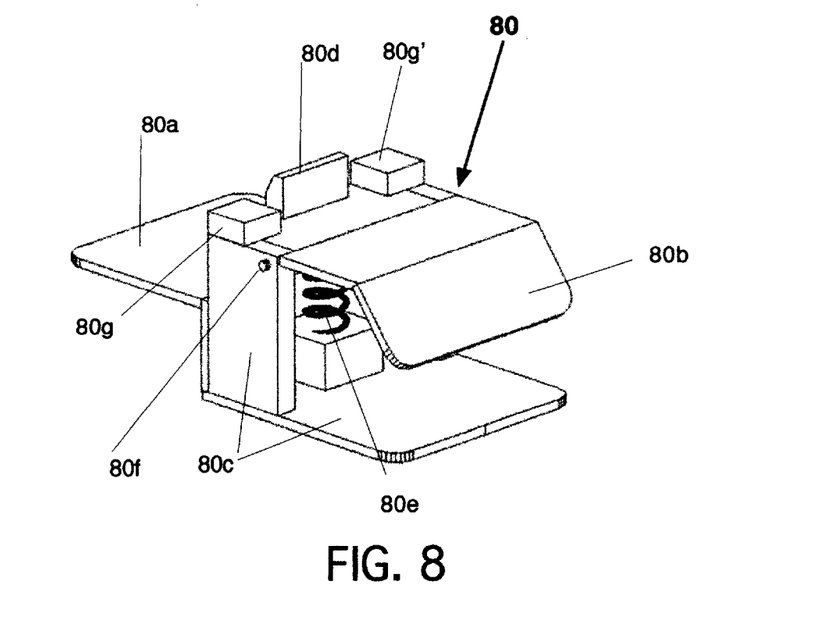
FIG. 8 is an isometric view of a sandwich tong.

FIG. 8 is an isometric view of the preferred embodiment of a Sandwich Tong 80. A movable upper jaw 80*b* is pivotally attached to a fixed lower jaw 80*c* by a pivot 80*f*. Jaws 80*b* & 80*c* are held closed by a spring 80*e*. Attached to the back of jaw 80*c* is a planar flange 80*a*. A tong operating tab 84 is attached to the top of jaw 80*b*, A pair of stop blocks 80*g* and 80*g*' are attached to the top of jaw 80*c*.

Figure 9:
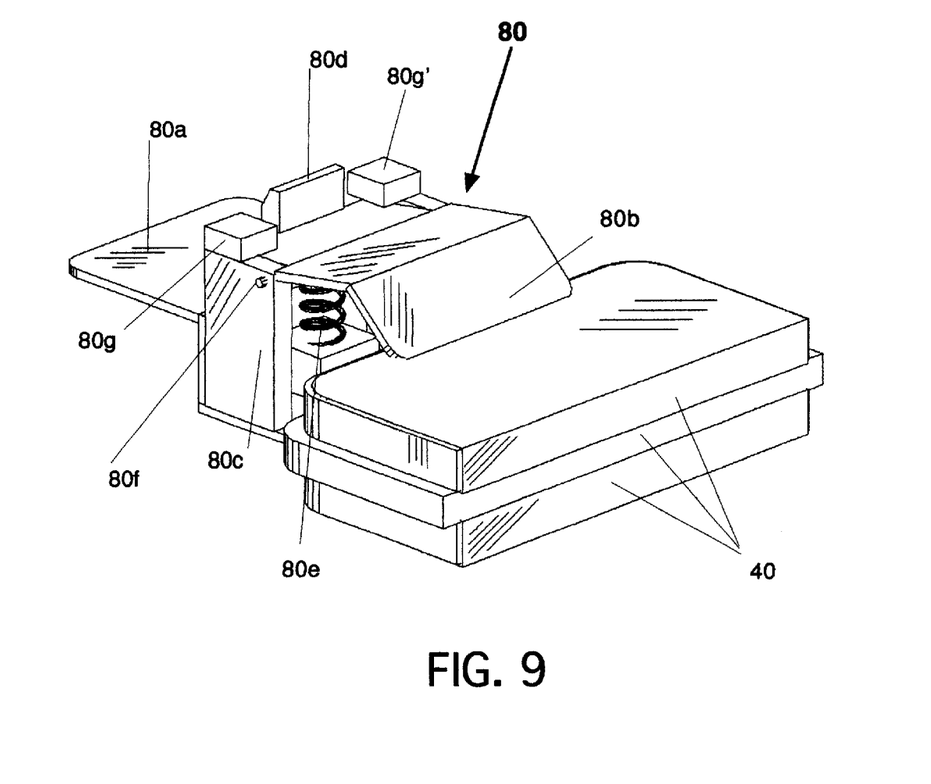
FIG. 9 is an isometric view of a sandwich tong holding a sandwich.

FIG. 9 shows the sandwich tong 80 of FIG. 8 grasping a sandwich 40.

Figure 10:
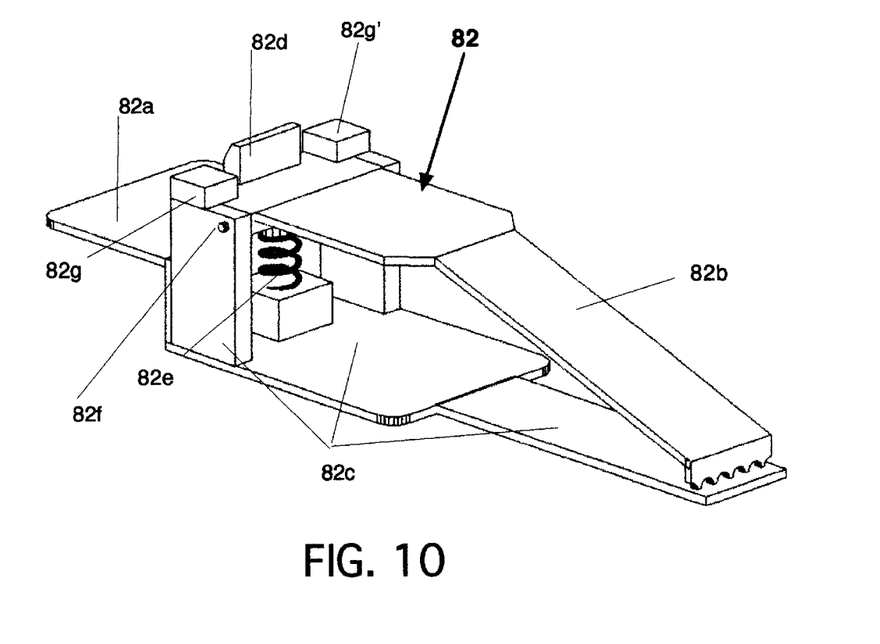
FIG. 10 is an isometric view of a snackfood tong

FIG. 10 is an isometric view of the preferred embodiment of a snackfood tong 82. A movable upper jaw 82*b* is pivotally attached to a fixed lower jaw 82*e* by a pivot 82*f*. Jaws 82*b* & 82*c* are held closed by a spring 82*e*. Attached to the back of jaw 82*c* is a planar flange 82*a*. A tong operating tab 82*d* is attached to the top of jaw 82*b*, A pair of stop blocks 82*g* and 82*g*' are attached to the top of jaw 82*c*.

Figure 11:
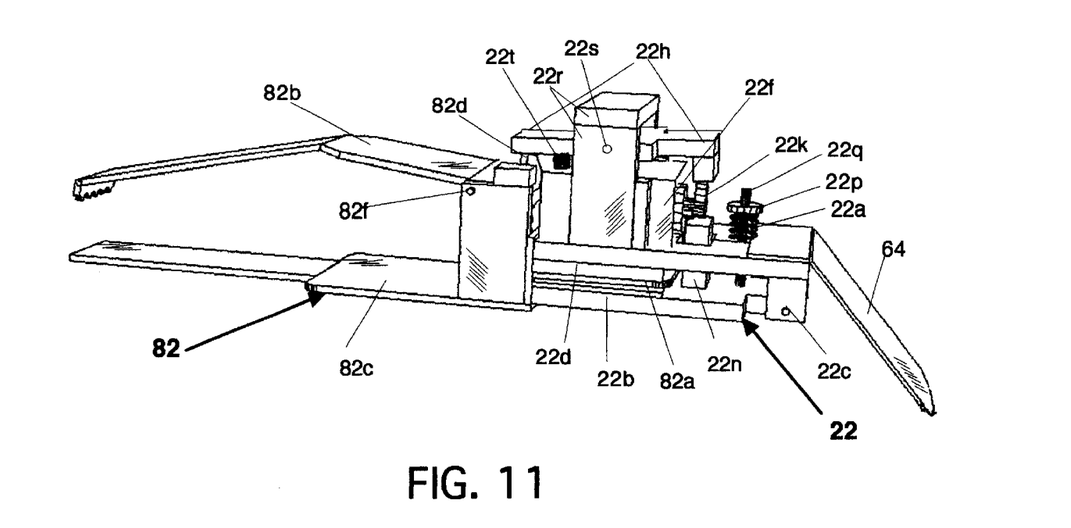
FIG. 11 is an isometric view of a snacldood tong being held open by a gripper

FIG. 11 is an isometric side view of the preferred embodiment of a snackfood tong 82 being grasped by and held open by the preferred embodiment of a gripper 22. Gripper 22 comprises a movable lower jaw 22*b* which is pivotally attached to an upper jaw 22*d* by means of a pivot 22*c*, Jaw 22*b* is held closed by a compression spring 22*a*. Spring 22*a* is held in place by a threaded rod 22*q* and nut 22*p*. Mounted to jaw 22*d* is a support structure 22*r* for an operating lever 22*h*. which is pivotally attached to structure 22*r* by a pivot rod 22*s*.. A compression spring 22*t* presses upward on the left end of lever 22*h*, holding the right end of lever 22*h* against a cam 22*k* which is mounted on the output shaft of a servo 22*f*. A jaw operating block 22*n* is mounted to jaw 22*b*. Cutter 64 is mounted to jaw 22*d*.

Tong flange 82*a* is shown grasped between gripper jaws 22*b* & 22*d*.. Operating lever 22*h* is shown pressing downward on operating tab 82*d*.

Figure 12:
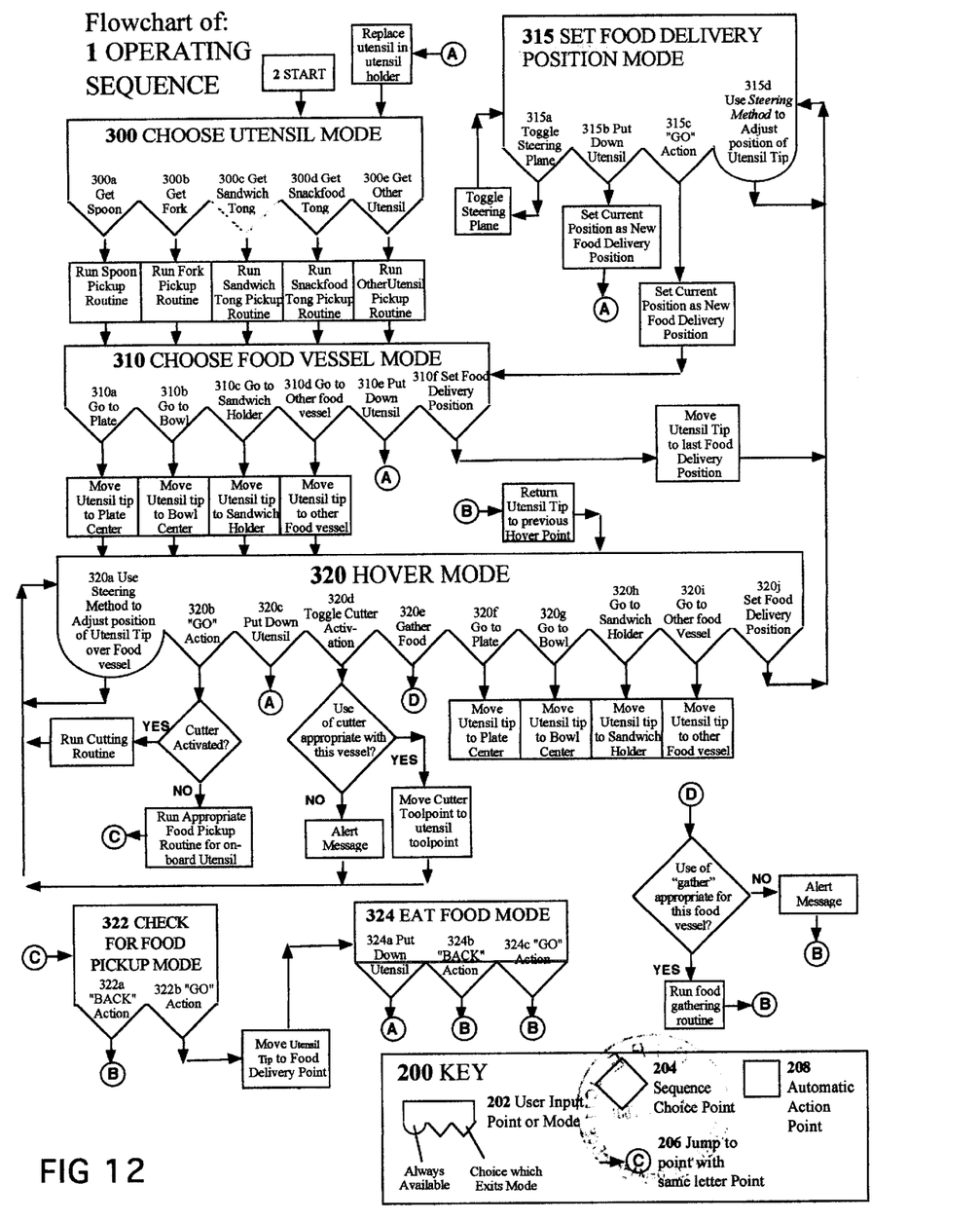
FIG. 12 is a flow chart of the Operating Sequence

FIG. 12 is a flow chart of an operating sequence 1, which provides the essential structure for a control system or a computer program to control the self-feeding apparatus. A key 200, explains the symbols used. They are:

a. a user input point or mode 202, b. a point where the sequence makes a choice of actions based on conditions stated in a diamond 204 c. a point where the program or sequence jumps to another point with a circled letter 206 d. a point where the program or sequence takes the action stated in the rectangle automatically 208

Operating Sequence 1 comprises a STARTUP 2, a CHOOSE UTENSIL MODE 300, a CHOOSE FOOD VESSEL MODE 310, a SET FOOD DELIVERY POSITION MODE 315, a HOVER MODE 320, a CHECK FOR FOOD PICKUP MODE 322, and an EAT FOOD MODE 324.

CHOOSE UTENSIL MODE 300 comprises a set of user choices 300*a*, through 300*e*. Their names and consequent program choices and actions are shown on the flow chart.

CHOOSE FOOD VESSEL MODE 310, comprises a set of user choices 310*a* through 310*f*. Their names and consequent program choices and actions are shown on the flow chart.

HOVER MODE 320 comprises a set of user choices 320*a* through 320*j*. Their names and consequent program choices and actions are shown on the flow chart.

CHECK FOR FOOD PICKUP MODE 322 comprises a set of user choices 322*a* and 322*b*. Their names and consequent program choices and actions are shown on the flow chart.

EAT FOOD MODE 324 comprises a set of user choices 324*a* through 324*c*. Their names and consequent program choices and actions are shown on the flow chart.

OPERATION OF INVENTION

The key to the success of this self feeding apparatus is that it taxes the operator's concentration very little. With my self-feeding apparatus the user can pay attention to people at the table, the television, happenings out the window or events across the lunchroom rather than the mechanics of picking up or spearing food. The operating sequence is transparent to the operator—it requires no more concentration, after a bit of practice, than picking up a fork and spearing a piece of pineapple for an able bodied person.

FIG. 12 is a flow chart of the Operating Sequence 1 of the self-feeding apparatus. Please reference FIG. 12 throughout the whole Operation of Invention section. The steps to operate my self-feeding apparatus are as follows:

Preparation

FIG. 1 & FIG. 2

Before use by a person who may have a paralysis disability, the self-feeding device must be prepared for use. The person doing the set-up places a set of one or more appropriate food holding vessels 30 on surface 44 at locations known to the operating software In the preferred embodiment they are set on a tray 34 which has depressions or locating sockets capable of locating each vessel 30 to an accuracy of about ±1 mm.. Vessels 30 can include one or more plates, bowls, sandwich holders, food trays, microwave containers, refrigerator dishes, compartmented dishes, and compartmented dishes or trays found in frozen dinners [Stouffer's or Lean Cuisine for instance]. Robot 20 is located, placed or clamped in a position such that all vessels 30 are within its operating envelope. In the preferred embodiment surface 44 is a planar base to which the robot is rigidly mounted which has locating guides 46 for tray 34 capable or reliably locating tray 34 to an accuracy of approximately ±1 mm.

In utensil holder 100 are placed a set of one or more utensils 28 including but not limited to spoons, forks, sporks, sandwich tongs 80 and tongs for picking up discrete pieces of food such as chips, pretzels or chicken nuggets, referred to here as snackfood tongs 82.

In setting up the preferred embodiment FIG. 2, surface 44 is placed on another planar surface such as a table 45 which is at an appropriate height for user 29 to eat. Food 35 is put in vessels 30, utensils 28, are put in one or more utensil holders 100, and the self-feeding apparatus is turned on using a conventional on-off switch, causing Operating Sequence 1 to begin at startup point 2, then moving immediately to CHOOSE UTENSIL MODE 300.

User Start-Up & Operation

Once preparation is complete user 29 positions herself at an appropriate position for eating and in a position where she can reach and operate an interface or interfaces 26. User 29 then interacts with the Operating Sequence FIG. 12 as follows:

The operating sequence 1 is in CHOOSE UTENSIL MODE. 300 User 29 has a choice of one or more utensils to pick up. In the preferred embodiment there are these choices:

- a. get spoon 300a—which causes gripper 22 to move to a utensil holder 100 and pick up a spoon,
- b. get fork 300b—which causes gripper 22 to move to a utensil holder 100 and pick up a fork
- c. get sandwich tong 300c—which causes gripper 22 to move to a utensil holder 100 and pick up a sandwich tong 80. See FIG. 8 & FIG. 9.
- d. get snackfood tong 300d—which causes gripper 22 to move to a utensil holder 100 and pick up a snackfood tong 82. See FIG. 10 & FIG. 11.
- e. get other utensil 300e—which causes gripper 22 to move to a utensil holder 100 and pick up the utensil selected.

User 29 makes choices using the following features of the input devices 26:

- a. With joystick 26a a pair of buttons to step through the choices forward or backward are used.
- b. With gamepad 26b a pair of buttons to step through the choices forward or backward are used.
- c. With keyboard 26c a pair of keys to step through the choices forward or backward are used.
- d. With voice 26d spoken commands are used.
- e. With multiple switches 26e a pair of switches to step through the choices forward or backward are used,
- f. With standard computer pointing device including but not limited to mouse, trackball and, touchscreen 26f moving the cursor on the screen and clicking on the appropriate screen button is done.

When the desired choice is highlighted user 29 selects it. The Operating Sequence 1 automatically runs the appropriate routine to pick up the chosen utensil 28 and enters CHOOSE FOOD VESSEL MODE 310.

Choices available in CHOOSE VESSEL MODE 310 are:
- a. 310a go to plate—which moves utensil tip 28a to a position over the center of the plate at hover height 31,
- b. 310b go to bowl—which moves tip 28a to a position over the center of the bowl at hover height 31,
- c. 310c go to sandwich holder—which moves tip 28a to a position over the center of the sandwich holder at hover height 31,
- d. 310d go to otherfood vessel—which moves tip 28a to a position over the center of another food vessel 30 should one be present at hover height 31,
- e. 310e put down utensil—which replaces utensil 28 in holder 100,
- f. 310f set food delivery position—which is described in the next section.

In this example user 29 selects set food delivery position 310f, the utensil tip now moves to the most recently used food delivery position. and the Operating Sequence 1 enters SET FOOD DELIVERY POSITION MODE 315.

Set Food Delivery Position see FIG. 3.

User 29 can now use the steering method of input device 26 to adjust the position of tip 28a until it is just in front of her mouth, which is food delivery position 27. First user 29 either accepts the current steering plane 50 or 52 as indicated on the display or selects the other steering plane by choosing toggle steering planes 315a. By choosing the vertical plane 50 and using the steering method of the chosen input device 26, user 29 can steer the utensil left 50a or right 50b or up 50c or down 50d. By choosing the horizontal plane 52 and using the steering method of the chosen input device 26, user 29 can steer the utensil left 52a or right 52b or toward 52c or away 52d.

User 29 accomplishes steering in different ways as follows:
- a. With joystick 26a by using the joystick handle
- b With gamepad 26b by using the rocker button.
- c. With keyboard 26c by using the arrow keys,
- d. With voice 26d by giving spoken commands.
- e. With multiple switches 26e by using a steering array of four conventional momentary switches
- f. With mouse or other mouse-type device 26f by moving the cursor over a designated area on the screen, holding the button down and steering the cursor.

Having steered the tip of utensil 28 to an acceptable food delivery point 27, user 29 now has two choices:
- a. 315b put down utensil—which causes the position of tip 28a to become the food delivery position 27 for all utensils and replaces utensil 28 in holder 100.
- b. 315c "GO" action—which causes the position of tip 28a to become the food delivery position for all utensils. and the Operating Sequence 1 to return to CHOOSE VESSEL MODE 310.

The "GO" action is chosen in a different way depending on which input device 26 is used:
- a. With joystick 26a it will be chosen by the trigger button or another button of the user's choice. It will always be the same button which will not be used for anything else
- b. With gamepad 26b it will always be chosen by the same button which will not be used for anything else
- c. With keyboard 26c it will always be chosen by the same key which will not be used for anything else.
- d. With voice 26d it will be chosen by a command such as "Go", "Proceed" or a word of appropriate meaning which will not be used for anything else.
- e. With a multiple switch array 26e it will be chosen by a switch which will not be used for anything else
- f. With a mouse 26f it will be chosen by a screen button labeled "Go", "Proceed" or a word of appropriate meaning which will not be used for anything else.

Upon returning to CHOOSE VESSEL MODE 310 the same choices are available as before. Since delivery point 27 is now set, User 29 can now choose a food vessel 30. Once the choice is made, Operating Sequence 1 moves tip 28a over the center of vessel 30 at hover height 31 and enters HOVER MODEL 320

Hover Mode—the Eating Process

See FIG. 4 & FIG. 5.

In HOVER MODE. 320 the choices available are:
- a. 320a use steering method of input device—allows user 29 to move tip 28a in the horizontal plane over vessel 30. If user 29 attempts to steer tip 28*a* to a position not over the food holding surface of vessel 30, an alert sound may be played and tip 28*a* will not move any farther in that direction. This feature is very helpful for people with low dexterity because they cannot inadvertently move utensil 28 out of position. NOTE that use steering method 320*a* is automatically available at all times when in HOVER MODE 320.

b. 320*b* "GO" action—will cause the food at pickup position 96, just under tip 28*a* to be picked up or cut. The manner in which this is done will depend on which utensil 28 is being held by gripper 22. The "GO" action 320*b* will be chosen as in SET DELIVERY POSITION MODE 315 The "GO" action 320*b* will cause the following to happen:
1. If cutter 64 is activated, cutter tip 64*a* will descend to eating surface 32, execute a cutting routine and return to hover point 94. Operating Sequence 1 remains in HOVER MODE 320.
2. If gripper 22 is holding a fork it will move vertically down to spear food. and return approximately to its previous position. Operating Sequence 1 will then enter CHECK FOR FOOD PICKUP MODE 322.
3. If gripper 22 is holding a spoon it will descend to the plate, make a scooping motion, and rise to a position where tip 28*a* is approximately at the previous hover point but the spoon will now be oriented with its bowl horizontal to avoid spilling food. Operating Sequence 1 will then enter CHECK FOR PICKUP MODE 322.
4. If gripper 22 is holding a snackfood tong 82 it will open jaws 82*b* & 82*c*, execute a food pickup routine and return tip 28*a* to hover point 94. The Operating Sequence 1 will then enter CHECK FOR PICKUP MODE 322.
5. If gripper 22 is holding the sandwich tong it will execute a sandwich pickup routine, and return tip 28*a* approximately to its previous position, hover point 94. Operating Sequence 1 will then enter CHECK FOR PICKUP MODE 322.
6. If gripper 22 is holding a utensil not specified in choices 1–5 above it will make the appropriate preprogrammed motions to allow it to pick up the food at pickup point 96 and then return to its hover point 94 while changing orientation of utensil 28 in such a way that food does not spill. Operating Sequence 1 will then enter 322 CHECK FOR PICKUP MODE 322.

c. 320*c* put down utensil—replace utensil 28 in holder 100, Operating Sequence 1 enters CHOOSE UTENSIL MODE 300.

d. 320*d* toggle cutter activation—[see FIG. 6] if use of cutter 64 is appropriate for the current vessel 30, [Use of cutter 64 is not appropriate for the sandwich holder vessel 30*c*, for instance], Operating Sequence 1 will rotate gripper 22 to a position such that cutter tip 64*a* now occupies the previous position of utensil tip 28*a* at hover point 94. If use of cutter 64 is not appropriate, an alert box may be displayed, an alert sound may be played, and tip 28*a* will not move.

If cutter 64 is already activated, selecting toggle cutter 320*d* reverses the above motions, rotating gripper 22 to a position such that utensil tip 28*a* now occupies the previous position of cutter tip 64*a* at hover point 94. In either case Operating Sequence 1 then returns to HOVER MODE 320.

e. 320*e* gather food—[see FIG. 7] if gathering food together is appropriate for current utensil 28 and current vessel 30, tip 28*a* is moved through a set of moves called a gather path. In FIG. 7 two gather paths 90 & 92 are shown. In a gather routine tip 28*a* will follow a minimum of two gather paths.

Following path1 90 tip 28*a* moves away from hover position 94 right and toward user 29 following path 90*a*, then down 90*b*, then left and away from user 29 following path 90*c*, then up 90*d*, returning to hover position 94.

Following path1 92 tip 28*a* moves away from hover position 94 left and toward user 29 following path 92*a*, then down 92*b*, then right and away from user 29 following path 92*c*, then up 92*d*, returning to hover position 94.

When the gather routine is complete, pieces of food which had become separated will now be in a tighter grouping at pickup position 96.

Other gather paths will be similar to path1 90 and path2 92 but will go in different directions and a gather routine will typically have more than two gather paths.

If gathering food together is not appropriate [e.g. the current vessel 30 is sandwich holder 30*c*], an alert box may be displayed, an alert sound may be played, and tip 28*a* will not move.

f. Choices 320*f*, 320*g*, 320*h*, 320*i* in HOVER MODE 320 select the different food vessels just as in CHOOSE VESSEL MODE 310. If a vessel 30 other than the current vessel is chosen, tip 28*a* moves to a hover position 94 over that vessel. If the current vessel 30 is chosen an alert box may be displayed, an alert sound may be played, and tip 28*a* will not move.

g. 320*j* set food delivery position—takes the same actions as set food delivery position 310*f*.

Check that Desired Food was Picked up

CHECK FOR FOOD PICKUP MODE 322 is only entered from HOVER MODE 320 and only after an action is chosen which could result in the pickup of food. [Such an action is a "GO" action choice when the cutter is not activated. In CHECK FOR PICKUP MODE 322 there are two choices:

a. 322*a* "BACK" Action—if the utensil holds no food or if it does not hold the desired food, user 29 can initiate the "Back" action 322*a*. This will be chosen differently depending on which input device 26 is used.
1. With joystick 26*a* and gainepad 26*b* it will always be chosen by the same button which will not be used for anything else
2. With keyboard 26*c* it will always be chosen by the same key which will not be used for anything else.
3. With voice 26*d* it will be chosen by a command such as "back", go back" or a word of equivalent meaning which will not be used for anything else.
4. With a multiple switch array 26*e* it will be chosen by a switch which will not be used for anything else.
5. With a mouse 26*f* it will be chosen by a screen button labeled "back", go back" or something of appropriate meaning which will not be used for anything else.

When this action is chosen, Operating Sequence 1 enters HOVER MODE 320, tip 28*a* returns to its previous hover position 94 and utensil 28 returns to its previous orientation.

b. 322*b* "GO" action—if the utensil does hold the desired food, choosing the "GO" action 322*b* causes the food to be brought to the eating position. The "GO" action 322*b* will be chosen as in SET DELIVERY POSITION MODE 315. When utensil 28 reaches eating position 27 Operating Sequence 1 enters EAT FOOD MODE 324.

Eat Food

In EAT FOOD MODE 324 utensil 28 remains motionless at the eating position until user 29 commands it to move. There are three choices which can be taken at any time:

a. 324a put utensil down—this returns utensil 28 to its place in utensil holder 100 and Operating Sequence 1 enters CHOOSE UTENSIL MODE 300.

b. 324b "BACK" action—this is triggered as in CHECK PICKUP MODE 322. When it is chosen tip 28a returns to the position it last occupied in HOVER MODE 320. When tip 28a reaches this position the Operating Sequence 1 returns to HOVER MODE 320.

c. 324c "GO" action—this is triggered as in CHECK FOR PICKUP MODE 322. When it is chosen tip 28a returns to the position it last occupied in HOVER MODE 320. When tip 28a reaches this position Operating Sequence 1 returns to HOVER MODE 320.

Following this operating sequence allows a person who may have severe paralysis to feed him/herself at a comfortable pace using easy and intuitive choices.

DESCRIPTION AND OPERATION OF OTHER ALTERNATIVE EMBODIMENTS

We have described two embodiments in the previous section: steerable interfaces and scanning interfaces. Following are some additional embodiments of my self feeding apparatus:

a. In another embodiment, the robot arm is set upon or mounted to the floor, mounted to the ceiling or mounted on or set upon the user's wheelchair rather than being set upon or clamped to a table or other eating surface.

b. In another embodiment, the user wears a glove which detects hand motions for control purposes.

c. In another embodiment, the self-feeding apparatus is operated by an interface which reads the operator's brainwaves and/or the motions of their eyes [Eye Gaze system], and/or electrical signals from the skin [Galvanic Skin Response or Myoelectrics], and/or actions of their tongue e.g. Tongue Touch Keypad by new Abilities Systems, Inc.

d. In another embodiment, incorporated into the self-feeding apparatus is a vision system which locates, identifies, and tracks food and which provides intelligent options and guidance for the operator.

e. In another embodiment, an artificial intelligence [AI] progran provides input to Operating Sequence 1. The AI program learns from the user's past actions and preferences and provides a suggested action at any given time.

f. In another embodiment, two or more utensils are be carried by the gripper all the time, allowing the self-feeding apparatus to switch among them more quickly.

g. In another embodiment, the robot arm is configured as a powered orthosis, attaching to the user's body as an exoskeleton. Utensil 28 is held in the user's hand rather than gripper 22.

h. In another embodiment there is a laser or other pointer attached i. In another embodiment the feeder robot operates in a free form environment. No racks or locating positions are provided for food holders or utensils. Each food holder and utensil has a bar code or other machine readable code label attached A small camera and/or label scanner is mounted on the gripper or in another location where it can see utensils and food holders. Scanning the labels tells the operating software the identity and location and orientation of each labeled item in the area. The operating software then cross references the label ID with its records and use the appropriate routine for pick up of utensils or for accessing a food holder. The use of these labels permits operating in a less structured environment without the need for a sophisticated, costly vision system capable of recognizing objects from their shapes alone This embodiment can also handle many other kinds of objects. Objects such as, but not limited to, hand tools (screw drivers, pliers, wire strippers, wire clippers), grooming tools (hair brushes, scissors, tooth brushes, razors), books, papers, file folders, cooking tools (pans, knives, cooking spoons, stove buttons) can all be inexpensively located, identified picked up and manipulated by this embodiment.

CONCLUSION, RAMIFICATIONS AND SCOPE

Thus the reader will see that the self feeding device of the invention provides an easy and intuitive way to eat for someone who may have severe paralysis. It can pick up food from essentially any location within reach, it does not require the use of non-standard dishes, it allows the user to select food flexibly, easily and intuitively. It can handle a wider variety of foods than any other self feeding device, It can cut food, automatically gather food, handle sandwiches, and use unmodified eating utensils Finally, it can be operated by people with a wider variety of disabilities than any other self-feeding device.

While my above description contains many specificities, these should not be construed as limitations on the scope of the invention, but rather as an exemplification of one preferred embodiment thereof. Many other variations are possible. The self-feeding device could be controlled by a virtual reality glove or by brain waves or by eye movements or muscle contractions or any other way a user can provide a control signal. The device could be mounted or supported in many ways including having the user wear it, making it a part of their clothing, it could rest in the user's lap or hung around his/her neck. It could be portable, capable of being quickly folded and carried from place to place. It could use chopsticks. It could cut food with a standard knife or knife/fork combination. The device could indicate food to be picked up by use of a laser or other light pointer, or a physical pointer, or lights under a transparent plate.

Accordingly, the scope of the invention should be determined not by the embodiments illustrated, but by the appended claims and their legal equivalents.

I claim:

1. A self feeding apparatus comprising:

a. a robotic arm b. a set of one or more food holding vessels selected from the group consisting of plates and bowls and trays and boxes and microwave containers and refrigerator dishes and compartmented food trays and frozen dinner trays, c. a set of one or more eating utensils selected from the group consisting of forks and spoons and sporks, d. a gripper mounted on the end of said robot arm, said gripper capable of grasping any of said utensils, e. a control apparatus to operate said robot arm which can cause said utensil to move over one of said food holding vessels (the selected food holding vessel), use said utensil to pick up food and convey said food to the food delivery position, f. an operating sequence which includes a hover mode in which said utensil is steered in the horizontal plane only and in which said utensil is constrained to remain over said selected food holding vessel, said hover mode constituting the subject matter which applicant regards as his invention, whereby persons who may have severe paralysis can easily and intuitively feed themselves a wide variety of foods in a sequence of their choice using a utensil of their choice from any of a wide variety of standard food holding vessels.

2. The self feeding apparatus of claim 1 wherein said set of eating utensils is selected from the group that also includes tongs and wherein said gripper is capable of operating said tongs.

3. The self feeding apparatus of claim 1 wherein said set of eating utensils is selected from the group that also includes other food manipulating devices and wherein said gripper is capable of operating said food manipulating devices.

4. The self feeding apparatus of claim 1 wherein there is a cutting tool attached to said gripper and wherein said control apparatus can cause the cutting tool to cut food.

5. The self feeding apparatus of claim 1 wherein said set of eating utensils is selected from the group that also includes knives and fork knife combinations wherein said control apparatus can cause the utensil to cut food.

6. The self feeding apparatus of claim 1 wherein said control apparatus receives operator input from an operator interface selected from the group consisting of joysticks and gamepads and keyboards and microphones and standard computer pointing devices and single and multiple switches.

7. The self feeding apparatus of claim 1 wherein said operating sequence includes a routine to gather separated food pieces into a tighter grouping.

8. A self feeding apparatus comprising:
a) a set of one or more food holding vessels selected from the group consisting of plates and bowls and trays and boxes and microwave containers and refrigerator dishes and frozen dinner trays,
b) an eating utensil selected from the group consisting of forks and spoons,
c) a means for grasping said eating utensil,
d) a means for controlling the motion of said eating utensil which can cause said eating utensil to move over a selected food holding vessel, use said utensil to pick up food and convey said food to the food delivery position,
e) an operating sequence which includes a hover mode in which said utensil is steered in the horizontal plane only and in which said utensil is constrained to remain over said selected food holding vessel, said hover mode constituting the subject matter which applicant regards as his invention, whereby persons who may have severe paralysis can easily and intuitively feed themselves a wide variety of foods in a sequence of their choice using a utensil of their choice from any of a wide variety of standard food holding vessels.

9. The self feeding apparatus of claim 8 wherein said set of eating utensils is selected from the group that also includes tongs and wherein said means for grasping is capable of operating said tongs.

10. The self feeding apparatus of claim 8 wherein said set of eating utensils is selected from the group that also includes other food manipulating devices and wherein said means for grasping is capable of operating said food manipulating devices.

11. The self feeding apparatus of claim 8 wherein there is a cutting tool attached to said means for grasping and wherein said means for controlling motion can cause the cutting tool to cut food.

12. The self feeding apparatus of claim 8 wherein said set of eating utensils is selected from the group that also includes knives and fork knife combinations wherein said means for controlling motion can cause the utensil to cut food.

13. The self feeding apparatus of claim 8 wherein said control apparatus receives operator input from an operator interface selected from the group consisting of joysticks and gamepads and keyboards and microphones and standard computer pointing devices and single and multiple switches.

14. The self feeding apparatus of claim 8 wherein said operating sequence includes a routine to gather separated food pieces into a tighter grouping.

\* \* \* \* \*